(12) United States Patent
Drissi et al.

(10) Patent No.: US 12,073,100 B2
(45) Date of Patent: Aug. 27, 2024

(54) HOST-ENABLED BLOCK SWAP TECHNIQUES

(71) Applicant: Micron Technology, Inc., Boise, ID (US)

(72) Inventors: Lalla Fatima Drissi, Ottaviano (IT); Anna Scalesse, Arzano (IT); Iolanda Del Villano, Villa di Briano (IT); Maddalena Calzolari, Milan (IT); Chiara Cerafogli, Boise, ID (US); Carla L. Christensen, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 93 days.

(21) Appl. No.: 17/663,137

(22) Filed: May 12, 2022

(65) Prior Publication Data

US 2023/0367495 A1   Nov. 16, 2023

(51) Int. Cl.
*G06F 3/06* (2006.01)
(52) U.S. Cl.
CPC ............ *G06F 3/064* (2013.01); *G06F 3/0616* (2013.01); *G06F 3/0619* (2013.01); *G06F 3/0659* (2013.01); *G06F 3/0679* (2013.01)
(58) Field of Classification Search
CPC ...... G06F 3/064; G06F 3/0616; G06F 3/0619; G06F 3/0659; G06F 3/0679

USPC .......................................................... 711/154
See application file for complete search history.

(56) References Cited

U.S. PATENT DOCUMENTS

| | | | |
|---|---|---|---|
| 9,626,289 B2 * | 4/2017 | Chen .................. | G06F 12/0246 |
| 10,254,981 B2 * | 4/2019 | Tomic .................... | G06F 3/064 |

FOREIGN PATENT DOCUMENTS

EP       3436953 A1 *   2/2019   ......... G06F 12/0246

* cited by examiner

*Primary Examiner* — Mardochee Chery
(74) *Attorney, Agent, or Firm* — Holland & Hart LLP

(57) ABSTRACT

Methods, systems, and devices for host-enabled block swap techniques are described. In some examples, a host system may receive an indication of a health metric associated with a first physical block and a second physical block of a memory system, where a first logical block of the memory system is associated with a first type of data and is mapped to the first physical block, and where a second logical block of the memory system is associated with a second type of data. The host system may then determine that the health metric associated with the first physical block satisfies a threshold and may update a mapping associated with the first virtual block, the second virtual block, the first physical block, and the second physical block.

25 Claims, 9 Drawing Sheets

HOST-ENABLED BLOCK SWAP TECHNIQUES

FIELD OF TECHNOLOGY

The following relates to one or more systems for memory, including host-enabled block swap techniques.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
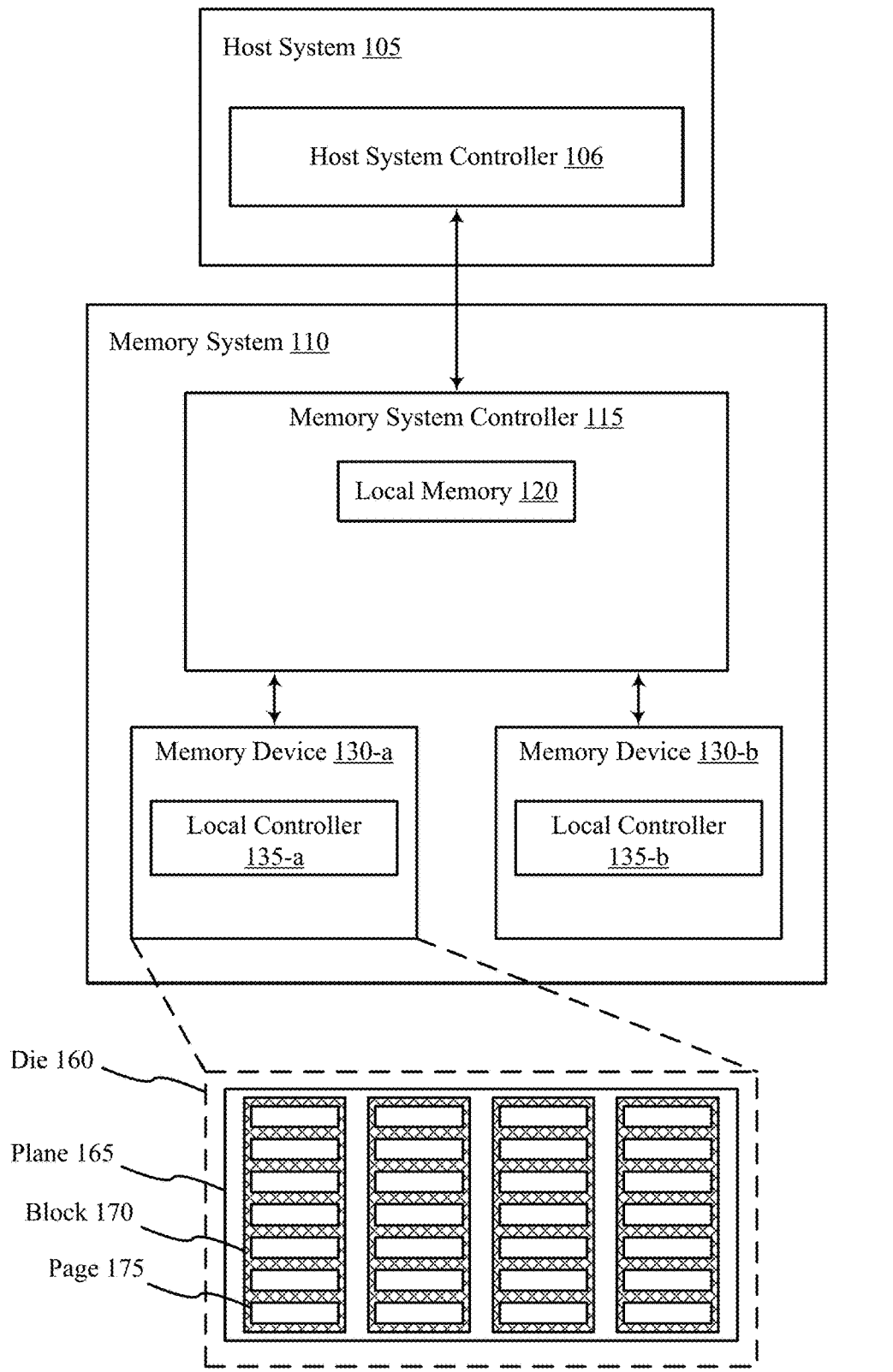
FIG. 1 illustrates an example of a system that supports host-enabled block swap techniques in accordance with examples as disclosed herein.

In some examples, a memory system may include an array of memory cells, where each memory cell of the array is configured to store one or more bits of information. The array of memory cells may be divided into blocks of memory cells (e.g., physical blocks of memory cells) that may have different storage characteristics and may be accessed independently from one another. In some instances, performing multiple access operations (e.g., read operations, write operations) on the blocks of memory cells may degrade the blocks of memory cells. Once a block of memory cells reaches some level of degradation, the memory system may retire the block, meaning that the retired block may no longer be used in the same way. Because some blocks of memory are accessed more frequently than others (or are otherwise more susceptible to being retired due to other characteristics), these blocks may be retired much sooner than others, which may negatively impact the performance of the memory system. Accordingly, a system configured to repurpose blocks based on or in response to the blocks' overall health, instead of retiring some blocks sooner than others, may be desirable.

A system configured to repurpose blocks based on or in response to the blocks' overall health is described herein. For example, a host system (e.g., a host system coupled with a memory system) may repurpose blocks of memory cells that are approaching a wear out threshold to prolong the life of the respective blocks. To determine whether to repurpose a particular block (or a set of blocks), which repurposing may be referred to herein as a "block swap" or a "block swap operation", one or more health metrics of the blocks may be determined. In some examples, the health metrics may be determined by the memory system (e.g., by a controller of the memory system), the host system, or some combination of both, and the health metrics may include a quantity of program (P/E) cycles performed on a respective block, among other example health metrics. Information indicating the health metrics or the health metrics themselves may be transmitted to a host system, which may initiate (e.g., perform) a block swap by remapping physical blocks of the memory system having one or more relatively high (or low) health metrics to different logical blocks that have one or more relatively low (or high) health metrics and are associated with less-frequent operations (e.g., less-frequent access operations). That is, physical blocks having relatively high (or low) health metrics may be effectively "swapped" with physical blocks having relatively low (or high) health metrics, which may extend the overall life of the memory system while improving overall performance, among other advantages.

Features of the disclosure are initially described in the context of systems as described with reference to FIGS. 1 through 2. Features of the disclosure are described in the context of memory devices and a process flow diagram with reference to FIGS. 3-5. These and other features of the disclosure are further illustrated by and described in the context of an apparatus diagram and flowchart that relate to host-enabled block swap with reference to FIGS. 6-10.

FIG. 1 illustrates an example of a system 100 that supports host-enabled block swap techniques in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random-access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer).

Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has not been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof.

The system 100 may include any quantity of non-transitory computer readable media that support host-enabled block swap techniques. For example, the host system 105, the memory system controller 115, or a memory device 130 (e.g., a local controller 135) may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

In some instances, as the blocks 170 of memory cells are accessed, or as the blocks 170 of memory cells otherwise age, the performance of the blocks 170 may degrade. Over time, the memory cells may degrade to a point where they are no longer reliable for a particular use and thus may be retired. In examples in which a block 170 of memory cells is retired, the block 170 may no longer be used in a same way. For example, the block 170 may either be replaced by another cell or may be used to store another type of data or used for a different type of operation(s)).

As described herein, the host system 105 (or a component of the memory system 110 such as the memory system controller 115) may repurpose blocks 170 to extend the life of a particular block 170 and, in turn, the life of the memory system 110. The host system 105 may perform a block swap operation to reassign a physical block 170 (e.g., from a first logical block to a different logical block) that is associated with a relatively high health metric (or in some examples a relatively low health metric). For example, the host system 105 may reassign a physical block 170 to a logical block associated with a different type of operation (e.g., a general-purpose operation versus an access operation), such that the physical block 170 is likely to wear out at a slower rate than it would have when associated with the prior logical block.

To determine whether to swap a particular block, the memory system controller 115 may determine one or more health metrics for the respective blocks 170 of the memory system 110 and may transmit the health metrics to the host system 105. Examples of the health metrics may include: a duration to perform a read operation on the physical blocks 170, a duration associated with writing logic states to the physical blocks 170, a quantity of write operations performed on the physical blocks 170, or a number of program-erase cycles performed on the physical blocks 170, other metrics, or any combination thereof. The host system 105 may determine whether the health metric for a respective physical block 170 (e.g., or for a plurality of physical blocks 170) satisfies (e.g., is greater than, equal to, less than) a particular threshold and, if it does, may remap the first block 170 to a different logical block. Accordingly, the life of one or more individual blocks—as well as life of the memory system 110—may be extended by rebalancing (e.g., remapping) physical blocks 170, for example, as workload, usage, or other system parameters change.

Figure 2:
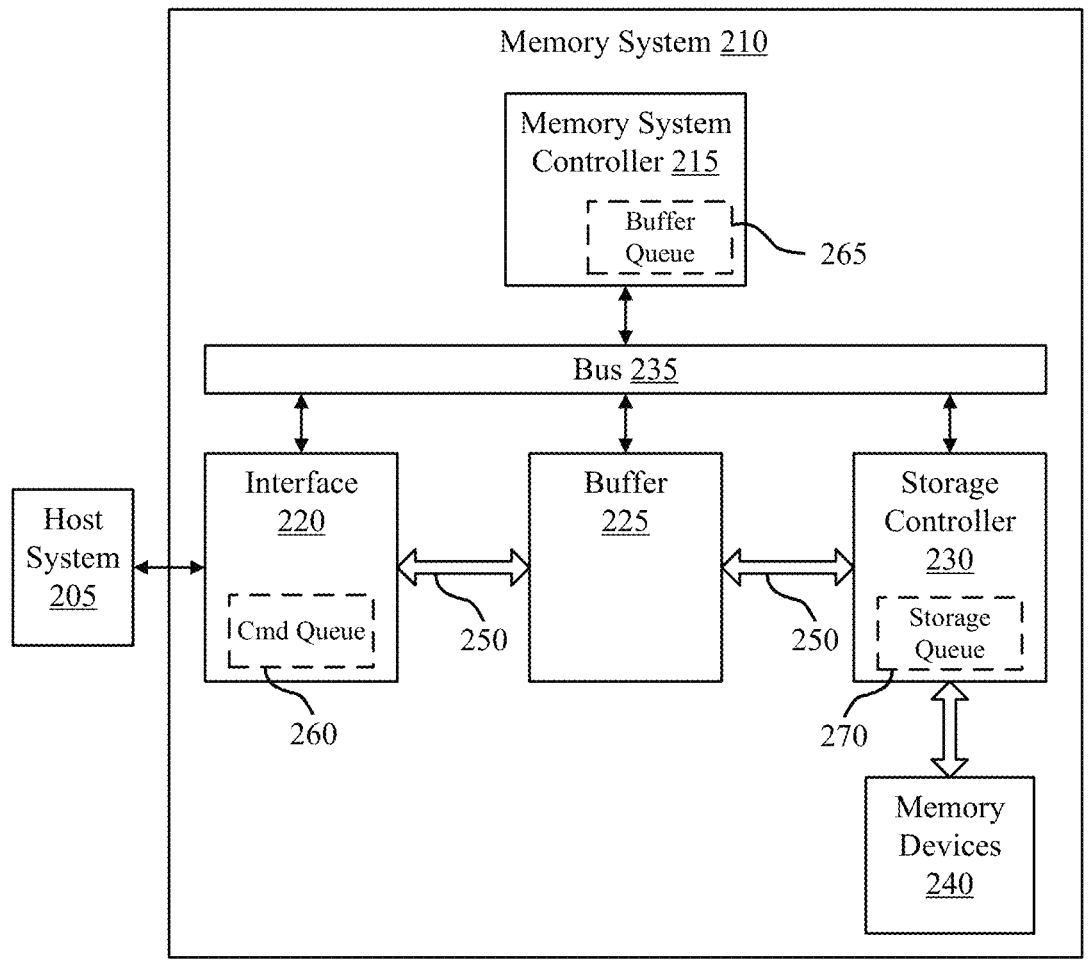
FIG. 2 illustrates an example of a system that supports host-enabled block swap techniques in accordance with examples as disclosed herein.

FIG. 2 illustrates an example of a system 200 that supports host-enabled block swap techniques in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include memory devices 240 to store data transferred between the memory system 210 and the host system 205, e.g., in response to receiving access commands from the host system 205, as described herein. The memory devices 240 may include one or more memory devices as described with reference to FIG. 1. For example, the memory devices 240 may include NAND memory, PCM, self-selecting memory, 3D cross point, other chalcogenide-based memories, FERAM, MRAM, NOR (e.g., NOR flash) memory, STT-MRAM, CBRAM, RRAM, or OxRAM.

The memory system 210 may include a storage controller 230 for controlling the passing of data directly to and from the memory devices 240, e.g., for storing data, retrieving data, and determining memory locations in which to store data and from which to retrieve data. The storage controller 230 may communicate with memory devices 240 directly or via a bus (not shown) using a protocol specific to each type of memory device 240. In some cases, a single storage controller 230 may be used to control multiple memory devices 240 of the same or different types. In some cases, the memory system 210 may include multiple storage controllers 230, e.g., a different storage controller 230 for each type of memory device 240. In some cases, a storage controller 230 may implement aspects of a local controller 135 as described with reference to FIG. 1.

The memory system 210 may additionally include an interface 220 for communication with the host system 205 and a buffer 225 for temporary storage of data being transferred between the host system 205 and the memory devices 240. The interface 220, buffer 225, and storage controller 230 may be for translating data between the host system 205 and the memory devices 240, e.g., as shown by a data path 250, and may be collectively referred to as data path components.

Using the buffer 225 to temporarily store data during transfers may allow data to be buffered as commands are being processed, thereby reducing latency between commands and allowing arbitrary data sizes associated with commands. This may also allow bursts of commands to be handled, and the buffered data may be stored or transmitted (or both) once a burst has stopped. The buffer 225 may include relatively fast memory (e.g., some types of volatile memory, such as SRAM or DRAM) or hardware accelerators or both to allow fast storage and retrieval of data to and from the buffer 225. The buffer 225 may include data path switching components for bi-directional data transfer between the buffer 225 and other components.

The temporary storage of data within a buffer 225 may refer to the storage of data in the buffer 225 during the execution of access commands. That is, upon completion of an access command, the associated data may no longer be maintained in the buffer 225 (e.g., may be overwritten with data for additional access commands). In addition, the buffer 225 may be a non-cache buffer. That is, data may not be read directly from the buffer 225 by the host system 205. For example, read commands may be added to a queue without an operation to match the address to addresses already in the buffer 225 (e.g., without a cache address match or lookup operation).

The memory system 210 may additionally include a memory system controller 215 for executing the commands received from the host system 205 and controlling the data path components in the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, and a storage queue 270) may be used to control the processing of the access commands and the movement of the corresponding data. This may be beneficial, e.g., if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if used, may be positioned anywhere within the memory system 210.

Data transferred between the host system 205 and the memory devices 240 may take a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220, e.g., according to a protocol (e.g., a UFS protocol or an eMMC protocol). Thus, the interface 220 may be considered a front end of the memory system 210. Upon receipt of each access command, the interface 220 may communicate the command to the memory system controller 215, e.g., via the bus 235. In some cases, each command may be added to a command queue 260 by the interface 220 to communicate the command to the memory system controller 215.

The memory system controller 215 may determine that an access command has been received based on or in response to the communication from the interface 220. In some cases, the memory system controller 215 may determine the access command has been received by retrieving the command from the command queue 260. The command may be removed from the command queue 260 after it has been retrieved therefrom, e.g., by the memory system controller 215. In some cases, the memory system controller 215 may cause the interface 220, e.g., via the bus 235, to remove the command from the command queue 260.

Upon the determination that an access command has been received, the memory system controller 215 may execute the access command. For a read command, this may mean obtaining data from the memory devices 240 and transmitting the data to the host system 205. For a write command, this may mean receiving data from the host system 205 and moving the data to the memory devices 240.

In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may first determine if the buffer 225 has sufficient available space to store the data associated with the command. For example, the memory system controller 215 may determine, e.g., via firmware (e.g., controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225.

That is, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), e.g., according to a protocol (e.g., a UFS protocol or an eMMC protocol). As the interface 220 subsequently receives from the host system 205 the data associated with the write command, the interface 220 may transfer the data to the buffer 225 for temporary storage using the data path 250. In some cases, the interface 220 may obtain from the buffer 225 or buffer queue 265 the location within the buffer 225 to store the data. The interface 220 may indicate to the memory system controller 215, e.g., via the bus 235, if the data transfer to the buffer 225 has been completed.

Once the write data has been stored in the buffer 225 by the interface 220, the data may be transferred out of the buffer 225 and stored in a memory device 240. This may be done using the storage controller 230. For example, the memory system controller 215 may cause the storage controller 230 to retrieve the data out of the buffer 225 using the data path 250 and transfer the data to a memory device 240. The storage controller 230 may be considered a back end of the memory system 210. The storage controller 230 may indicate to the memory system controller 215, e.g., via the bus 235, that the data transfer to a memory device of the memory devices 240 has been completed.

In some cases, a storage queue 270 may be used to aid with the transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain from the buffer 225, buffer queue 265, or storage queue 270 the location within the buffer 225 from which to obtain the data. The storage controller 230 may manage the locations within the memory devices 240 to store the data (e.g., performing wear-leveling, garbage collection, and the like). The entries may be added to the storage queue 270, e.g., by the memory system controller 215. The entries may be removed from the storage queue 270, e.g., by the storage controller 230 or memory system controller 215 upon completion of the transfer of the data.

To process a read command received from the host system 205, the memory system controller 215 may again first determine if the buffer 225 has sufficient available space to store the data associated with the command. For example, the memory system controller 215 may determine, e.g., via firmware (e.g., controller firmware), an amount of space within the buffer 225 that may be available to store data associated with the read command.

In some cases, the buffer queue 265 may be used to aid with buffer storage of data associated with read commands in a similar manner as discussed above with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215, e.g., via the bus 235, when the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain from the buffer 225 or storage queue 270 the location within the memory devices 240 from which to retrieve the data. In some cases, the storage controller 230 may obtain from the buffer queue 265 the location within the buffer 225 to store the data. In some cases, the storage controller 230 may obtain from the storage queue 270 the location within the buffer 225 to store the data. In some cases, the memory system controller 215 may move the command processed by the storage queue 270 back to the command queue 260.

Once the data has been stored in the buffer 225 by the storage controller 230, the data may be transferred out of the buffer 225 and sent to the host system 205. For example, the memory system controller 215 may cause the interface 220 to retrieve the data out of the buffer 225 using the data path 250 and transmit the data to the host system 205, e.g., according to a protocol (e.g., a UFS protocol or an eMMC protocol). For example, the interface 220 may process the command from the command queue 260 and may indicate to the memory system controller 215, e.g., via the bus 235, that the data transmission to the host system 205 has been completed.

The memory system controller 215 may execute received commands according to an order (e.g., a first-in, first-out order, according to the order of the command queue 260). For each command, the memory system controller 215 may cause data corresponding to the command to be moved into and out of the buffer 225, as discussed above. As the data is moved into and stored within the buffer 225, the command may remain in the buffer queue 265. A command may be removed from the buffer queue 265, e.g., by the memory system controller 215, if the processing of the command has been completed (e.g., if data corresponding to the access command has been transferred out of the buffer 225). If a command is removed from the buffer queue 265, the address previously storing the data associated with that command may be available to store data associated with a new command.

The memory system controller 215 may additionally be configured for operations associated with the memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. That is, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the above operations in conjunction with or instead of the memory system controller 215. In some cases, the memory system controller 215 may perform the functions of the storage controller 230 and the storage controller 230 may be omitted.

In some instances, as the blocks of the memory devices 240 are accessed, or as the blocks otherwise age, the performance of the blocks may degrade. Over time, the memory cells may degrade to a point where they are no longer reliable for a particular use and thus may be retired. In examples which a block of memory cells is retired, the block may no longer be used in a same way (e.g., the block may either be replaced by a redundant cell or may be used to store another type of data or for a different type of operation(s)).

As described herein, the host system 205 (or a component of the memory system 210 such as the memory system controller 215) may repurpose blocks to extend the life of one or more particular blocks and, in turn, the life of the memory system 210. That is, the memory host system 205 may perform a block swap operation to reassign one or more physical blocks (e.g., to a different logical block) that are associated with a relatively high (or low) health metric. For example, the host system 205 may reassign one or more physical blocks to a logical block associated with a different type of operation, such that the one or more physical blocks is likely to wear out at a slower rate than it would have when associated with the prior logical block.

To determine whether to swap a particular block, the memory system controller 215 may determine one or more health metrics for the respective blocks of the memory system 210 and may transmit an indication of the health metrics or the health metrics to the host system 205. Examples of the health metrics may include: a duration to perform a read operation on the physical blocks, a duration associated with writing logic states to the physical blocks, a quantity of write operations performed on the physical blocks, a number of program-erase cycles performed on the physical blocks, other health metrics, or any combination thereof. The host system 205 may determine whether the one or more health metrics for a respective physical block (e.g., or for a plurality of physical blocks) satisfies a particular threshold and, if the host system 205 does, may remap the first block to a different logical block. Accordingly, the life of one or more individual blocks—as well as life of the memory system 210—may be extended by rebalancing (e.g., remapping) physical blocks as workload, usage, or other system parameters change.

Figure 3A:
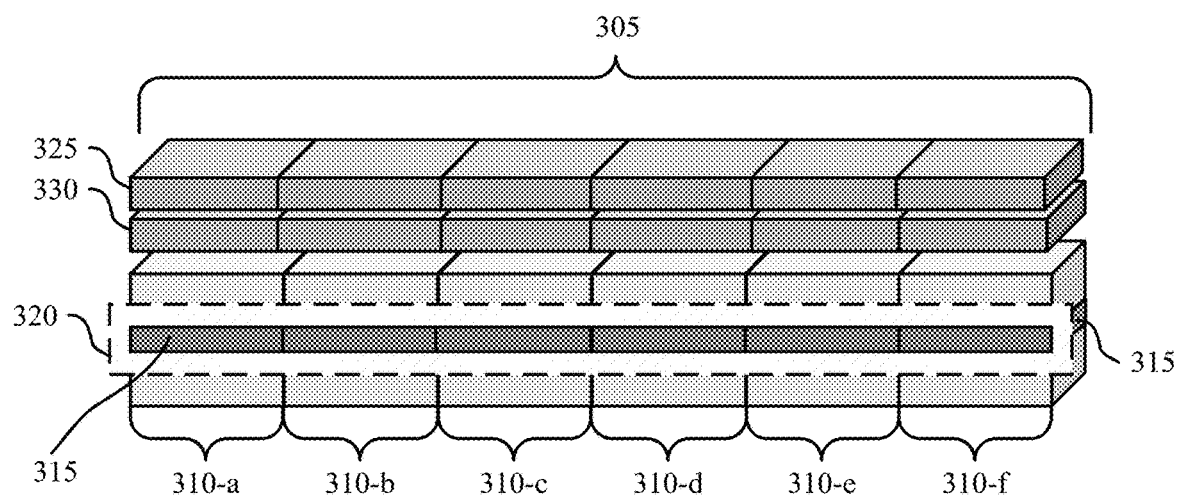
FIG. 3A illustrates an example of a memory device that supports host-enabled block swap techniques in accordance with examples as disclosed herein.

FIG. 3A illustrates an example of a memory device 300-*a* that supports host-enabled block swap techniques in accordance with examples as disclosed herein. The memory device 300-*a* may be included in a memory system and may include a memory die 305, which may be referred to as a logical unit (LUN). Although FIG. 3A illustrates a single memory die 305, the memory device 300-*a* may include any quantity of memory dice 305.

In some examples, the memory die 305 may include one or more planes 310 that may each include one or more physical blocks 315. As used herein, a "physical block" may refer to a physical portion of the memory die 305 that includes one or more memory cells, word lines, bit lines, etc. Although FIG. 3A illustrates the memory die 305 as including six (6) planes, the memory die 305 may include any number of planes and each plane 310 may include any number of physical blocks 315. Each physical block 315 may include one or more pages (e.g., one or more pages of data) that may be configured to store a quantity of data, such as 16 KB of data as an example. Moreover, each plane 310 may be associated with one or more cache registers 325 and one or more data registers 330.

Additionally or alternatively, each physical block 315 of the memory device 300-*a* may be associated with or included in a physical virtual block 320. As used herein, a "virtual block" may refer to a logical or physical arrangement of blocks. For example, a memory system (e.g., a memory system 110 as described with reference to FIG. 1) may include a plurality of memory devices 300-*a* and thus may include a plurality of physical virtual blocks 320 and each physical virtual block 320 may be composed of one or more physical blocks 315. Additionally or alternatively, a host system may access a physical virtual block 320 by transmitting a command associated with a logical virtual block. The memory device 300-*a* may store (or otherwise have access to) a table (e.g., a L2PVBT) that includes mappings between logical virtual blocks and physical virtual blocks 320. Thus, when the memory device 300-*a* receives a command associated with a logical virtual block, a controller or other component of the memory device 300-*a* may access a corresponding physical virtual block 320 based on or in response to the contents of the L2PVBT.

The host system may access memory cells of individual physical blocks 315. For example, the memory device 300-*a* may store (or otherwise have access to) a table (e.g., a L2P table) that includes mappings between logical addresses (e.g., logical block addresses (LBAs)) and physical blocks 315. Thus, when the memory device 300-*a* receives a command associated with a logical block, a controller or other component of the memory device 300-*a* may access a corresponding physical block 315 based on or in response to the contents of the L2P table.

Moreover, the memory cells of a physical block may be operated as single level cells (SLCs) when associated with certain logical blocks and may be operated as multi-level cells (MLCs) or triple-level cells (TLCs) or quadruple-level cells (QLCs) when associated with other logical blocks. Thus, any one logical block may be mapped to one or more physical blocks in one or more planes. In other examples, a logical physical block may be mapped to a physical virtual block 320 that includes physical blocks 315 in one or more planes 310. For example, a physical virtual block 320 may include one (1) physical block 315 in each of the six (6) planes 310 of the memory die 305.

In some examples, a logical virtual block that is mapped to the physical virtual block 320 may be associated with a first type of data or a first subset of operations to be performed on the memory device 300-*a*. For example, the logical virtual block may be associated with "user data," which may refer to data that is written to one or more physical blocks 315 of the corresponding physical virtual block 320 or read from one or more physical blocks 315 of the corresponding physical virtual block 320 based on or in response to a command received from a host system (e.g., a host system 105 as described with reference to FIG. 1). For example, the host system may transmit a write command to the memory device 300-*a* that includes data and a logical address (e.g., a logical block address (LBA)) or data and a logical virtual block.

Upon receiving the command, a controller of the memory device 300-*a* may determine a physical address of the memory die 305 (e.g., using a L2P table) or may determine a physical virtual block 320 (e.g., using a L2PVBT) and may write the data to the corresponding physical address or physical virtual block 320. In some examples, the controller may also utilize a virtual blocks table (VBsT), which may include mappings between physical blocks 315 and planes 310 of the memory die 305. The controller may thus determine a physical address to write the data to based on the L2P table, L2PVBT, and/or VBsT. For example, the physical address may be included in a physical block 315 of the physical virtual block 320.

In other examples, the memory die 305 may be associated with one or more additional logical virtual blocks that are mapped to other physical virtual blocks 320. These logical virtual blocks may be are associated with a second type of data (e.g., a different type of data than the first type of data) or a second subset of operations to be performed on the memory device 300-a. For example, other logical virtual blocks may be associated with firmware (e.g., a firmware image), metadata (e.g., different levels of metadata), and/or general-purpose processing (GPP). Moreover, memory cells of a physical block 315 (or a physical virtual block 320) that are mapped to such logical blocks (or logical virtual blocks) may be operated differently when mapped to different logical blocks. For example, memory cells of a physical block 315 may be operated as SLCs when the corresponding physical block 315 is associated with some logical blocks, and memory cells of a physical block 315 may be operated as MLCs or TLCs when the corresponding physical block 315 is associated with other logical blocks. The type and manner in which a memory cell is operated as when it is associated with a logical block may be a matter of design choice.

As described herein, physical blocks 315 may be swapped between logical blocks based on or in response to respective health metrics and based on or in response to a command (or commands) received from a host system. Physical virtual blocks 320 may be also be swapped between logical virtual blocks based on or in response to the health metrics and command. For example, a controller or other component of the memory device 300-a may determine and monitor health metrics of the physical blocks 315 of the physical virtual block 320 and may transmit an indication of the health metrics or the health metrics themselves to the host system. The host system may determine a health metric for an associated logical virtual block, which may be based on or in response to a health metric of any one physical block 315, a health metric of a subset of the physical blocks 315, or a health metric of each of the physical blocks 315 of the physical virtual block 320. In examples which the health metric satisfies a threshold, the host system may transmit a command to initiate a block swapping operation. In some instances, the command may be a vendor unique command, such as a command defined by a standard such as the Joint Electron Device Engineering Council (JEDEC) standard.

Upon receiving the command, either physical blocks 315 of the physical virtual block 320 or the entire physical virtual block 320 may be remapped. For example, when remapping the entire physical virtual block 320, a controller or other component of the memory device 300-a may update a L2PVBT to reflect the swap. In some instances the swap might entail remapping a different physical virtual block to the logical virtual block that was previously associated with the physical virtual block 320 and remapping the physical virtual block 320 to a different logical virtual block. The remapping may be based on or in response to the respective health metrics for the physical virtual blocks. By performing a block swapping operation as described herein, the life of any one physical block 315 (or of a physical virtual block 320)—as well as the life of the memory device 300-a—may be extended. Moreover, the overall performance of the memory device 300-a may be improved.

Figure 3B:
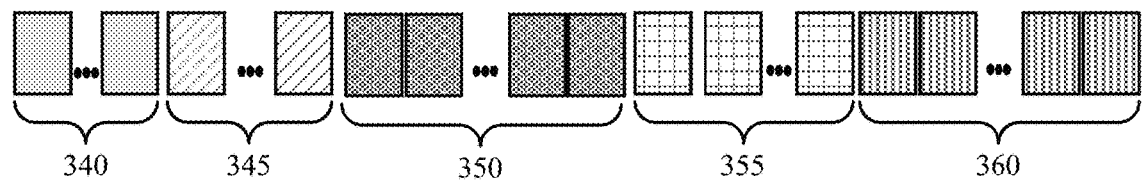
FIG. 3B illustrates an example of a system that supports host-enabled block swap techniques in accordance with examples as disclosed herein.

FIG. 3B illustrates an example of a block diagram 300-b that supports host-enabled block swap techniques in accordance with examples as disclosed herein. Block diagram 300-b demonstrates different types of logical blocks, and how the logical blocks may be allocated for a memory device, such as the memory device 300-a. For example, the memory device 300-a may include a first type of logical blocks 340, a second type of logical blocks 345, a third type of logical blocks 350, a fourth type of logical blocks 355, and a fifth type of logical blocks 360. Each type of logical blocks may be referred to collectively as a "logical space" and may be designated for different types of operations or different types of data. Each logical space may include any quantity of logical blocks that are associated with a memory die 305 of the memory device 300-a. Additionally or alternatively, each of the logical blocks may represent one or more logical virtual blocks, thus with respect to FIG. 3B, the terms "logical block" and "logical virtual block" may be used interchangeably.

A first type of logical blocks 340 may include logical blocks associated with firmware for the memory device 300-a. For example, firmware logical blocks 340 may be utilized for storing firmware and/or related metadata. Firmware logical blocks 340 may be utilized to manage the initialization operations and media management operations, as well as monitoring the status of the memory devices. Additionally or alternatively, a firmware logical block 340 may be utilized to contain the firmware image. Various numbers of logical blocks may be assigned to operate as firmware logical blocks 340. As an example, two logical blocks may be assigned to operate as firmware logical blocks 340.

A second type of logical blocks 345 may include virtual blocks associated with a system of the memory device 300-a. For example, system logical blocks 345 can store operational parameters for a memory device or may be utilized to contain the metadata of first level. Various numbers of logical blocks may be assigned to operate as system logical blocks 345. As an example, two logical blocks may be assigned to operate as system logical blocks 345.

A third type of logical blocks 350 may include logical blocks associated with tables for the memory device 300-a. For example, table logical blocks 350 can store tables (e.g., L2P tables, L2PVBTs, VBsT tables, etc.) for the memory device 300-a, or may be utilized to contain the metadata of second level. For example, table logical blocks 350 may be used to contain pointers to the pages within physical blocks (or physical virtual blocks). Various numbers of logical blocks may be assigned to operate as table logical blocks 345. As an example, four logical blocks may be assigned to operate as table logical blocks 350.

A fourth type of logical blocks 355 may include logical blocks associated with user data of the memory device 300-a. For example, enhanced logical blocks 355 may be utilized for operations related to user data (e.g., access operations such as read, write, erase operations). Additionally or alternatively, user data may also include other general-purpose data such as data relating to boot sequencing. In some examples, the memory cells of physical blocks that are associated with the enhanced logical blocks 355 may be operates as SLCs.

A fifth type of logical blocks 360 may include logical blocks associated with general purpose data of the memory device 300-a. For example, normal logical blocks 360 may be utilized for operations related to general purpose processing (GPP), which may refer to data utilized by a CPU or other component of the memory device 300-a. In some examples, the memory cells of physical blocks that are associated with the normal logical blocks 360 may be operates as MLCs or TLCs.

Each of the logical blocks of a logical space described with reference to FIG. 3B may be mapped to corresponding physical blocks (e.g., physical blocks 315 as described with reference to FIG. 3A) or corresponding physical virtual blocks (e.g., physical virtual blocks 320 as described with reference to FIG. 3B). Moreover, the physical blocks or the physical virtual blocks mapped to a respective logical block or logical virtual block may be remapped during a block swap operation. By performing a block swapping operation as described herein, the associated memory system may effectively balance (or rebalance) physical blocks between logical spaces if workload or usage parameters of the memory system change, which may improve the overall performance of the associated memory system.

Figure 4:
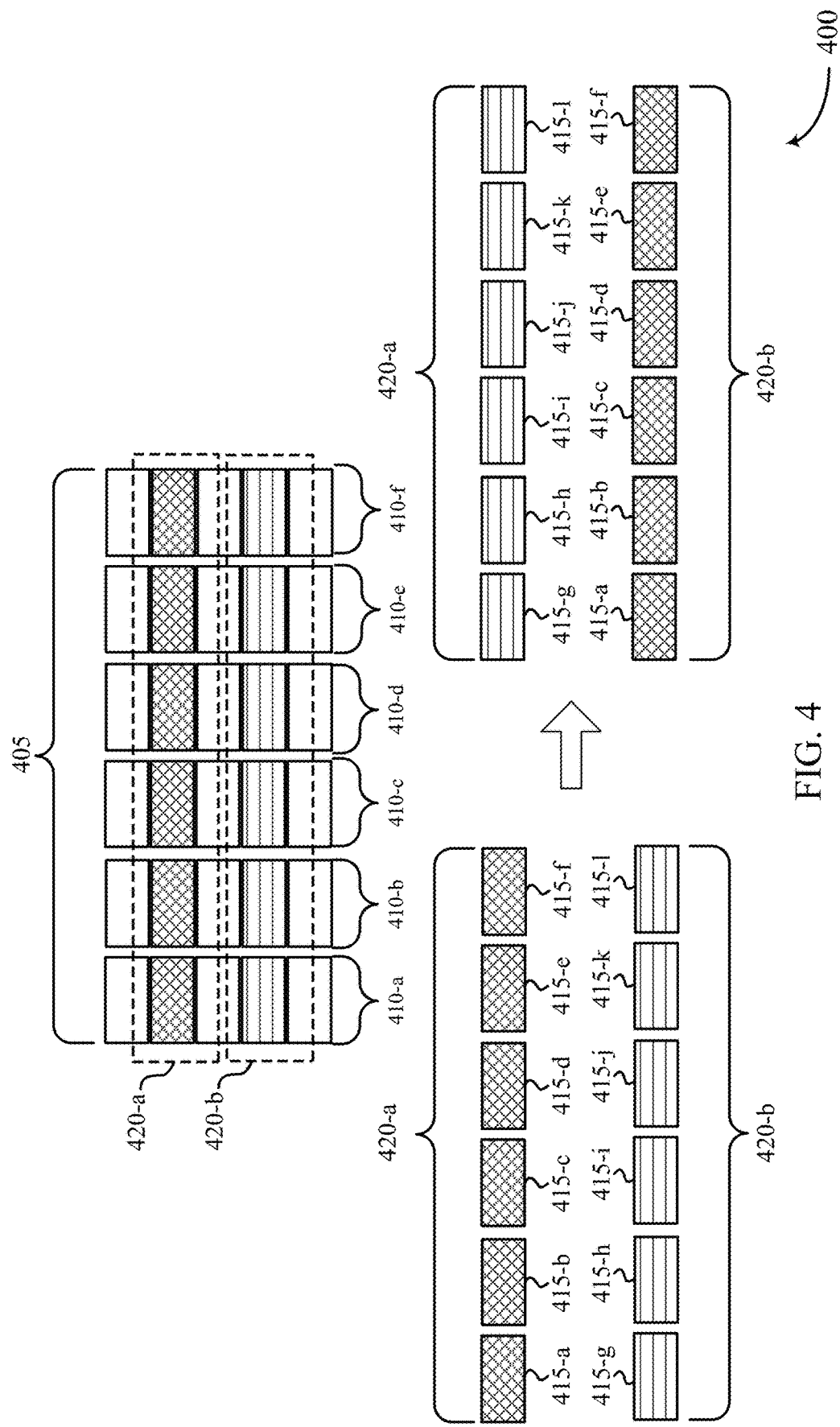
FIG. 4 illustrates an example of a block diagram that supports host-enabled block swap techniques in accordance with examples as disclosed herein.

FIG. 4 illustrates an example of a block diagram 400 that supports host-enabled block swap techniques in accordance with examples as disclosed herein. The block diagram 400 illustrates a block swap operation between physical virtual blocks 420 of a memory die 405. In some examples, the memory die 405 may include one or more planes 410 that each include one or physical blocks 415 of memory cells. As described herein, a set of physical blocks 415 from one or more planes 410 may be referred to as a physical virtual block 420. Each physical virtual block may be mapped to a respective logical space as described with reference to FIG. 3. For exemplary purposes only, a first physical virtual block 420-a may be mapped to an enhanced logical virtual block and a second physical virtual block 420-b may be mapped to a normal logical virtual block.

To support a block swap operation, a host system may monitor health metrics for one or more physical blocks 415, if not each physical block 415. In some examples, the host system or a memory system coupled with the host system may use the health metrics to construct a virtual block health report, which may include one or more health metrics for the memory system. For example, the host system may generate the virtual health report based on one or more health metrics received from the memory system. In other examples, the memory system may generate the virtual health report (e.g., using one or more health metrics) and may transmit the virtual health report to the host system.

The virtual block report may include health information associated with a logical virtual block and may be constructed using a health metric of one or more physical blocks 415 of a physical virtual block 420. Thus, in some examples, the virtual block health report may include health information for each physical block 415 corresponding to the physical virtual block 420. As an example, the virtual block health report may include a health metric that is based on or in response to a count of PIE cycles performed on the respective physical blocks 415, a block erase count (e.g., minimum, maximum, and average) for physical blocks 415 of the same storage state corresponding to the physical virtual block 420 (e.g., a block erase count for SLC blocks and a block erase count for MLC blocks), an exhausted life for a logical virtual block, etc.

Additionally or alternatively, the virtual block health report may include health metrics for the physical blocks 415 or for a physical virtual block 420 of the memory system. The health metrics may include a quantity of program-erase (P/E) cycles for a physical block 415 or for a physical virtual block 420. For example, a relatively high quantity of P/E cycles may result in a physical block 415 or a physical virtual block 420 having a relatively high health metric, whereas a relatively low quantity of P/E cycles may result in the physical block 415 or the physical virtual block 420 having a relatively low health metric.

Other health metrics may include duration to perform a read operation on a respective physical block 415, a duration associated with writing logic states to the respective physical block 415 (e.g., tPROG) of memory cells, a duration associated with erasing the logic states stored at the block of memory cells (e.g., tBER), a quantity of read operations performed on the block of memory cells, a quantity of write operations performed on the block of memory cells, a quantity of byte failures associated with the block of memory cells (e.g., CFBYTE), exhausted life, or any combination thereof.

The host system may determine (e.g., calculate) an exhausted life for a logical virtual block. The host may perform the determination using the health metrics for each physical block 415 of a corresponding physical virtual block 420. Exhausted life may be expressed as a percentage and may be calculated by dividing an average quantity of erase cycles performed on the physical blocks of interest by a threshold quantity of erase cycles performed on the physical blocks of interest. An example of a threshold value for exhausted life may be 80%, 90%, or 100%.

The host system may transmit a command for the virtual block health report and the memory system may generate the virtual health report in response to the command. Once generated, the memory system may transmit the virtual block health report to the host system. In some instances, the host system may use the virtual block health report to determine which physical blocks 415 or which physical virtual block 420 to perform a swapping operation on. For example, if the memory system or the host system determines that one or more of the health metrics of the health report exceeds a respective threshold, the host may initiate a block swap on a per-block or a per-virtual-block level.

In some examples, a block swap may occur upon the host determining that a health metric associated with one or more physical virtual blocks 420 satisfies a threshold. For example, the threshold could be a quantity of PIE cycles for the physical virtual block 420 or a threshold associated with any one of the health metrics described herein. The host may perform the block swapping operation by updating a mapping between logical virtual blocks and physical virtual blocks 420 of the memory system. That is, in some examples the host system may manage (e.g., all or a portion of) a L2PVBT and may update the mappings in the table based on or in response to the threshold being satisfied. In other examples, a block swap operation may be performed on a per-block basis and the memory system may update aspects of a L2P table based on or in response to one more physical blocks 415 being swapped. The host system may perform the block swap operation by transmitting signaling to the memory device to update the respective table(s).

In examples which a block swap operation is performed, a physical block 415 or a physical virtual block 420 having a relatively high health metric may be "swapped" with a physical block 415 or a physical virtual block 420 having a relatively low health metric. Moreover, the block or blocks having the relatively low health metric may be associated with a different logical block or logical virtual block. Thus the swap may be based on or in response to determining that a health metric associated with a first physical virtual block 420-a satisfies the threshold and that the health metric associated with a second physical virtual block 420-b does not satisfy the threshold value. As described herein, a swap can alternatively be performed on a per-block-basis. In some examples, the block swap may occur when the memory system is operating in an idle state.

As used herein, a "threshold" or a "threshold value" may refer to a magnitude or quantity used for measurement by comparison. A comparison is utilized to determine an action to take. For example, a threshold may be a desired number, quantity, or status, or it may be a desired maximum or minimum value. A given threshold may indicate a desired maximum, which once met, causes some action. A threshold may also be a configurable quantity that may be changed based on or in response to a new desired comparison. Any measurement may be used for a threshold, including any or all the examples of health metric measurements listed herein, or others not listed. In some examples, a host system may set, configure, reconfigure, or adjust a threshold at any time, including changing the desired measured health metric, value of the threshold, or any other change not listed.

By way of example, FIG. 4 illustrates a block swapping operation between physical blocks 415 of a first physical virtual block 420-a and a second physical virtual block 420-b. For example, a controller of the associated memory system may identify a health metric of each of the physical blocks 415-a through 415-f of the first physical virtual block 420-a and may transmit the health metrics to a host system. The controller may also identify a health metric of each of the physical blocks 415-g through 415-l of the second physical virtual block 420-b. The controller may transfer each of the health metrics to a host system (e.g., a host system 105 as described with reference to FIG. 1).

The host system may receive the health metrics and may determine a health metric for an associated physical virtual block (or for an associated logical virtual block) based on or in response to the individual health metrics for the physical blocks 415. In some examples, the host system may determine a health metric for a physical virtual block (or a logical virtual block) by averaging each of the health metrics of the physical blocks 415 of the corresponding physical virtual block 420. In other examples, the host system may determine the health metric for the logical block based on or in response to the highest health metric of the physical blocks 415 of the corresponding physical virtual block 420 or based on or in response to an average of a subset of the health metrics of the physical blocks 415 of the corresponding physical virtual block 420.

In such an example, the host system may use a quantity of PIE cycles to determine the health metric and may determine that the health metric associated the first physical virtual block 420-a (or with the logical virtual block corresponding to the first physical virtual block 420-a) satisfies a threshold value. Additionally or alternatively, the host system may determine that a health metric associated with the second physical virtual block 420-b (or with the logical virtual block corresponding to the second physical virtual block 420-b) does not satisfy the threshold value. Accordingly, the host system may initiate a block swap operation between the physical blocks of the first physical virtual block 420-a and the second physical virtual block 420-b.

To initiate the block swap, the host system may transmit signaling to the associated memory system. The signaling may include an indication of the new (e.g., the updated) mapping and the memory system may update a L2PVBT based on or in response to receiving the signaling. That is, the host system may instruct the memory system to update a table that contains mappings between logical virtual blocks and physical virtual blocks of the memory system to reflect the swap.

As described herein, the logical virtual block initially mapped to the first physical virtual block 420-a may be associated with an enhanced logical space and the logical virtual block mapped to the second physical virtual block 420-b may be associated with a normal logical space. Moreover, memory cells of the physical blocks 415 mapped to the normal virtual space may be operated as MLCs or TLCs and memory cells of the physical blocks 415 mapped to the enhanced virtual blocks may be operated as SLCs. Accordingly, after the block swap occurs, the memory cells of the second physical virtual block 420-b may be associated with user data (e.g., with an enhanced virtual space) and may be operated as a SLCs, whereas memory cells of the first physical virtual block 420-a may be associated with GPP data (e.g., with a normal virtual block) and may be operated as a MLC or a TLC.

In other instances, individual blocks may swapped during a single block swap operation. For example, as shown in FIG. 4, a single physical block 415 (such as a physical block 415-c) may be associated with a relatively high health metric and may be remapped to a different logical virtual block. The physical block 415-c may be swapped with a physical block (e.g., a physical block 415-j) that is associated with a relatively low health metric. Moreover, multiple physical virtual blocks 420 or multiple physical blocks 415 may be swapped during a single swapping operation. As described herein, any quantity of physical blocks 415 or physical virtual blocks 420 having a health metric that satisfies a respective threshold value may be swapped during a block swapping operation. By performing a block swapping operation as described herein, the life of any one block—as well as the life of the memory system—may be extended. Moreover, the overall performance of the memory system may be improved.

Figure 5:
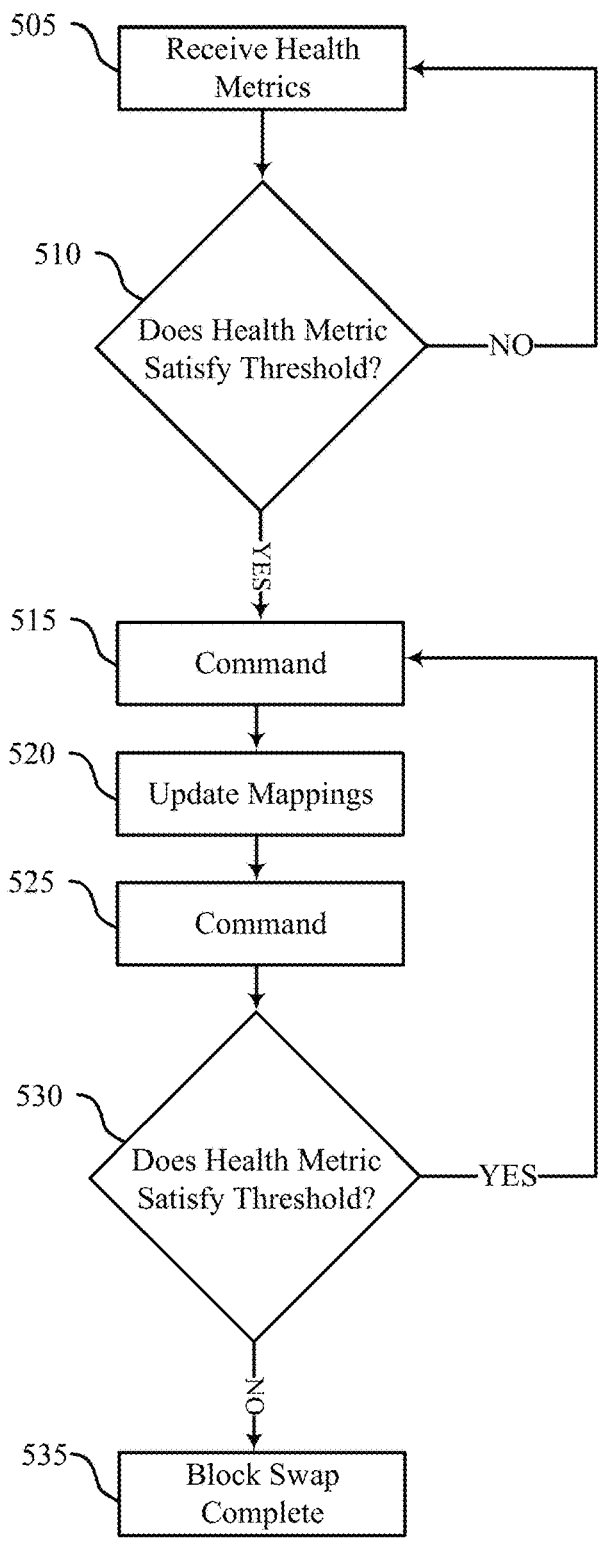
FIG. 5 illustrates an example of a process flow diagram that supports host-enabled block swap techniques in accordance with examples as disclosed herein.

FIG. 5 illustrates an example of a process flow diagram 500 that supports host-enabled block swap techniques in accordance with examples as disclosed herein. The process flow diagram 500 illustrates one or more steps of a block swap operation that are performed at a memory system and at a host system. Although the steps for the block swap operation are illustrated and described in a particular order, the operations described herein may be performed in any order. Moreover, some steps may be omitted from the process flow diagram 500, whereas other steps may be added. Performing a block swapping operation as described herein may improve the life of any one block, as well as the life of the memory system. Moreover, performing the block swap operation may improve the overall performance of the memory system.

Aspects of the process flow 500 may be implemented by a controller (e.g., a memory system controller 115 as described with reference to FIG. 1), among other components. Additionally or alternatively, aspects of the process flow 500 may be implemented as instructions stored in memory (e.g., firmware stored in a memory coupled with a host device (e.g., a host device 105 as described with reference to FIG. 1), a memory system (e.g., a memory system 110 as described with reference to FIG. 1), or both). For example, the instructions, when executed by a processor or a controller (e.g., a processor of the host system or the memory system controller 115), may cause the processor or controller to perform the operations of the process flow 500.

In some instances, before the first step of the process flow diagram 500 is performed, an associated memory system may be initially programmed or initialized. At the first programming or initialization, a logical block layout may be defined. This layout may include designating various logical spaces (e.g., logical blocks and/or logical virtual blocks) for certain purposes. For example, as described with reference to FIG. 3B, different logical blocks may be designated for firmware, system information, tables such as L2P tables or L2PVBTs, user data, and GPP. Each logical block may be mapped to one or more physical blocks (and logical virtual blocks may be mapped to physical virtual blocks), and the physical blocks may be swapped between logical blocks based on or in response to a comparison between an associated health metric and a threshold value.

At 505, a plurality of health metrics may be determined (e.g., obtained). For example, a host system may obtain a plurality of health metrics from a memory system. The health metrics may be associated with one or more physical blocks or physical virtual blocks of the memory system and may be obtained during initialization of the memory system, during an idle period, or based on or in response to the host system transmitting a command to the memory system (e.g., a command requesting the health metrics). A controller of the memory system may transmit the health metrics to the host system.

At 510, a determination may be made whether the health metrics for one or more blocks or one or more physical virtual blocks satisfies a threshold value. For example, a host system may determine whether the health metrics for one or more blocks or one or more physical virtual blocks satisfies the threshold value. For example, the host system may determine whether a health metric associated with a quantity of P/E cycles for a physical virtual block satisfies a threshold value. If the health metric for the physical virtual block does not satisfy the threshold then the block swap operation for the respective physical virtual block may end and the process flow may return to step 505. However, if the health metric for the physical virtual block satisfies the threshold value, the block swap operation may continue.

At 515, a command may be transmitted to the memory system if the health metric satisfies the threshold value. For example, the host system may transmit the command to the memory system. The command may be a vendor-unique command, such as a command that is defined by a standard (e.g., a JEDEC standard). The command may instruct the memory system to update an L2P table or a L2PVBT (depending on whether a physical block or a physical virtual block is being swapped) that is stored at the memory system. That is, the host system may instruct the memory system to update a table that includes mappings between logical blocks and physical blocks of the memory system.

At 520, an L2P table or a L2PVBT may be updated based on or in response to receiving the command. For example, the memory system may update the L2P table or the L2PVBT table based on or in response to receiving the command. The table may be updated to reflect the new mappings between the physical blocks and the logical bocks of the memory system.

At 525, a command may be transmitted to the host system when the mapping updates are concluded. For example, the memory system may transmit the command to the host system. The command may indicate that the mapping update is complete. The command may be a vendor-unique command, such as a command that is defined by a standard (e.g., a JEDEC standard).

At 530, an optional determination may be made as to whether the health metrics of the swapped blocks satisfy the threshold value. For example, the host system may optionally determine whether the health metrics of the swapped blocks satisfy the threshold value. For example, at 510 the host system may have determined that the health metric of a first physical virtual block satisfies a threshold value and may have initiated a block swap with a second physical virtual block (e.g., at 515).

At 535, it may be verified whether the health metric of the second physical block satisfies the threshold value. For example, the host system may verify whether the health metric of the second physical block satisfies the threshold value. If the health metric satisfies the threshold value (e.g., if the health metric still satisfies the threshold value) then the process flow may return to step 515 and the host system may initiate a second block swap operation (e.g., the host may again perform a block swap in attempt to lower the exhausted life of the corresponding logical virtual block). However, if the health metric does not satisfy the threshold value (e.g., if the exhausted life of the corresponding logical virtual block is effectively reduced due to the block swap) then the block swap operation was successfully completed. At 535, the block swap operation may be complete.

Figure 6:
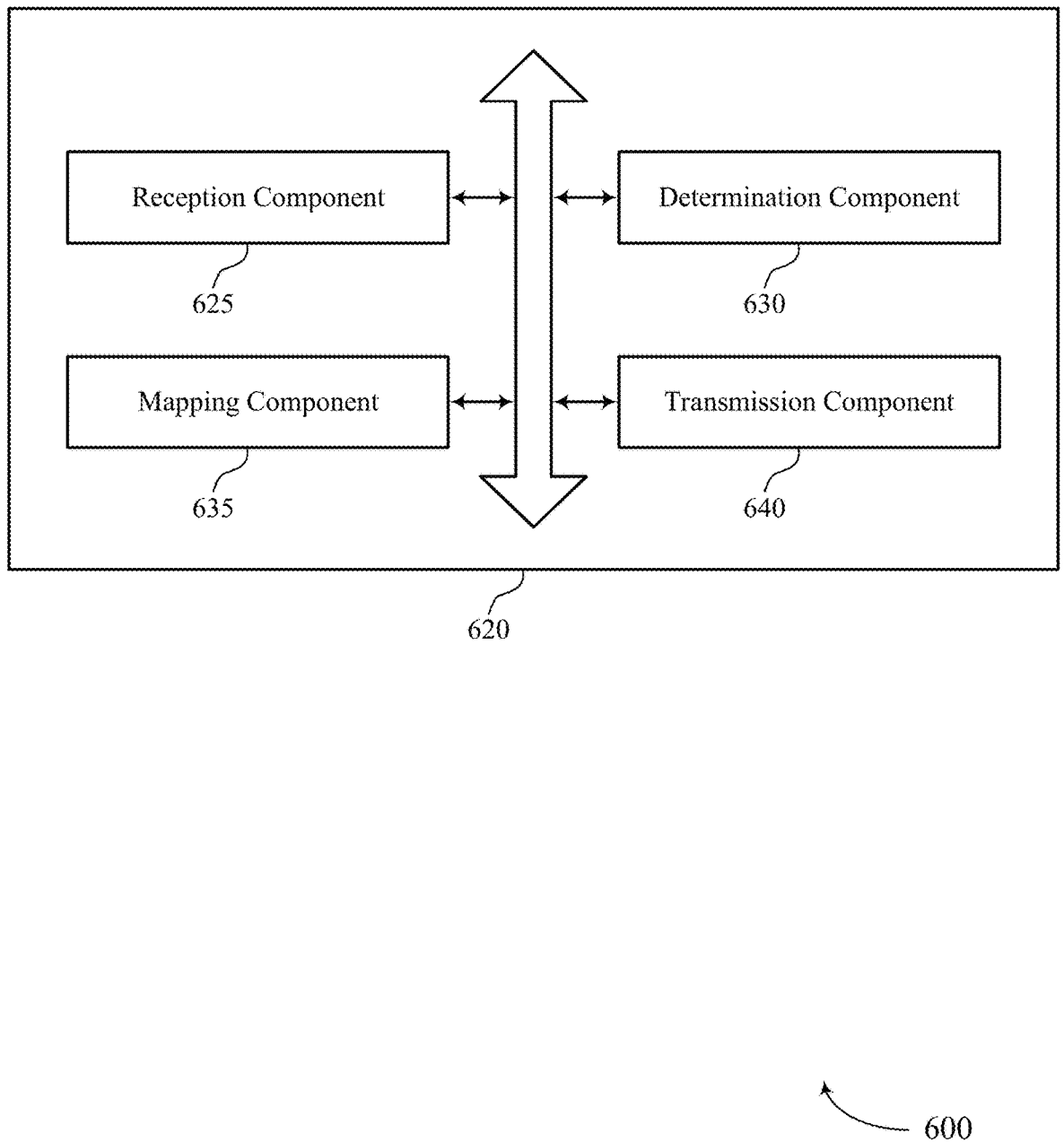
FIG. 6 shows a block diagram of a host device that supports host-enabled block swap techniques in accordance with examples as disclosed herein.

FIG. 6 shows a block diagram 600 of a host device 620 that supports host-enabled block swap techniques in accordance with examples as disclosed herein. The host device 620 may be an example of aspects of a host device as described with reference to FIGS. 1 through 5. The host device 620, or various components thereof, may be an example of means for performing various aspects of host-enabled block swap techniques as described herein. For example, the host device 620 may include a reception component 625, a determination component 630, a mapping component 635, a transmission component 640, or any combination thereof. Each of these components may communicate, directly or indirectly, with one another (e.g., via one or more buses).

The reception component 625 may be configured as or otherwise support a means for receiving, at a host system, an indication of a health metric associated with a first physical block and a second physical block of a memory system, where a first logical block of the memory system is associated with a first type of data and is mapped to the first physical block, and where a second logical block of the memory system is associated with a second type of data and is mapped to the second physical block. In some examples, the reception component 625 may be configured as or otherwise support a means for receiving, at the host system, an indication of a second health metric associated with the second physical block and a third physical block of the memory system.

The determination component 630 may be configured as or otherwise support a means for determining, by the host system, that the health metric associated with the first physical block satisfies a threshold. In some examples, the determination component 630 may be configured as or otherwise support a means for determining that the health metric associated with the second physical block does not satisfy a second threshold, where updating the mapping between the first logical block and the first physical block and the second logical block and the second physical block is based at least in part on determining that the health metric associated with the first physical block satisfies the threshold and determining that the second physical block does not satisfy the second threshold.

In some examples, to support determining that the health metric associated with the first physical block satisfies the threshold, the determination component 630 may be configured as or otherwise support a means for determining that the first physical block has been subject to a greater quantity of program/erase cycles than a plurality of other physical blocks of the memory system, where the second physical block has been subject to a lesser quantity of program/erase cycles than the first physical block and the plurality of other physical blocks of the memory system. In some examples, the determination component 630 may be configured as or otherwise support a means for determining, by the host system, that the memory system is operating in an idle state.

In some examples, the determination component 630 may be configured as or otherwise support a means for determining, by the host system, that the second health metric associated with the second physical block satisfies the threshold.

The mapping component 635 may be configured as or otherwise support a means for updating, by the host system based at least in part on determining that the health metric associated with the first physical block satisfies the threshold, a mapping associated with the first logical block, the second logical block, the first physical block, and the second physical block. In some examples, to support updating the mapping between the first logical block and the first physical block and the second logical block and the second physical block, the mapping component 635 may be configured as or otherwise support a means for mapping the first logical block to the second physical block.

In some examples, to support updating the mapping between the first logical block and the first physical block and the second logical block and the second physical block, the mapping component 635 may be configured as or otherwise support a means for mapping the second logical block to the first physical block. In some examples, the mapping component 635 may be configured as or otherwise support a means for updating, by the host system, a mapping between the first logical block and the second physical block and a mapping between the second logical block and the third physical block based at least in part on determining that the second health metric associated with the second physical block satisfies the threshold.

In some examples, to support updated mapping associated with the first logical block, the second logical block, the first physical block, and the second physical block, the mapping component 635 may be configured as or otherwise support a means for mapping the first logical block to the second physical block. In some examples, to support updated mapping associated with the first logical block, the second logical block, the first physical block, and the second physical block, the mapping component 635 may be configured as or otherwise support a means for mapping the second logical block to the first physical block.

In some examples, the transmission component 640 may be configured as or otherwise support a means for transmitting a first command to the memory system based at least in part on determining that the memory system is operating in the idle state, where receiving the health metric associated with the first physical block and the second physical block of the memory system is based at least in part on transmitting the first command.

In some examples, the transmission component 640 may be configured as or otherwise support a means for transmitting, based at least in part on updating the mapping between the first logical block and the first physical block and the mapping between the second logical block and the second physical block, a second command to the memory system, where the second command includes an indication for the memory system to update a table including mappings between a plurality of logical blocks and a plurality of physical blocks of the memory system.

In some examples, memory cells included in the first physical block are configured to store one bit of data when the first physical block is mapped to the first logical block, and where and the memory cells included in the first physical block are configured to store one or more bits of data when the first physical block is mapped to the second logical block. In some examples, the health metric includes a quantity of program/erase cycles of the first physical block and the second physical block.

In some examples, the health metric includes a duration to write one or more logic states to the first physical block and the second physical block, a duration to erase one or more logic states stored to the first physical block and the second physical block, a duration to read one or more logic states from the first physical block and the second physical block, a quantity of read operations performed on the first physical block and the second physical block, a number of byte failures associated with the first physical block and the second physical block, or any combination thereof. In some examples, the first type of data includes user data. In some examples, the second type of data includes general purpose processing (GPP) data.

Figure 7:
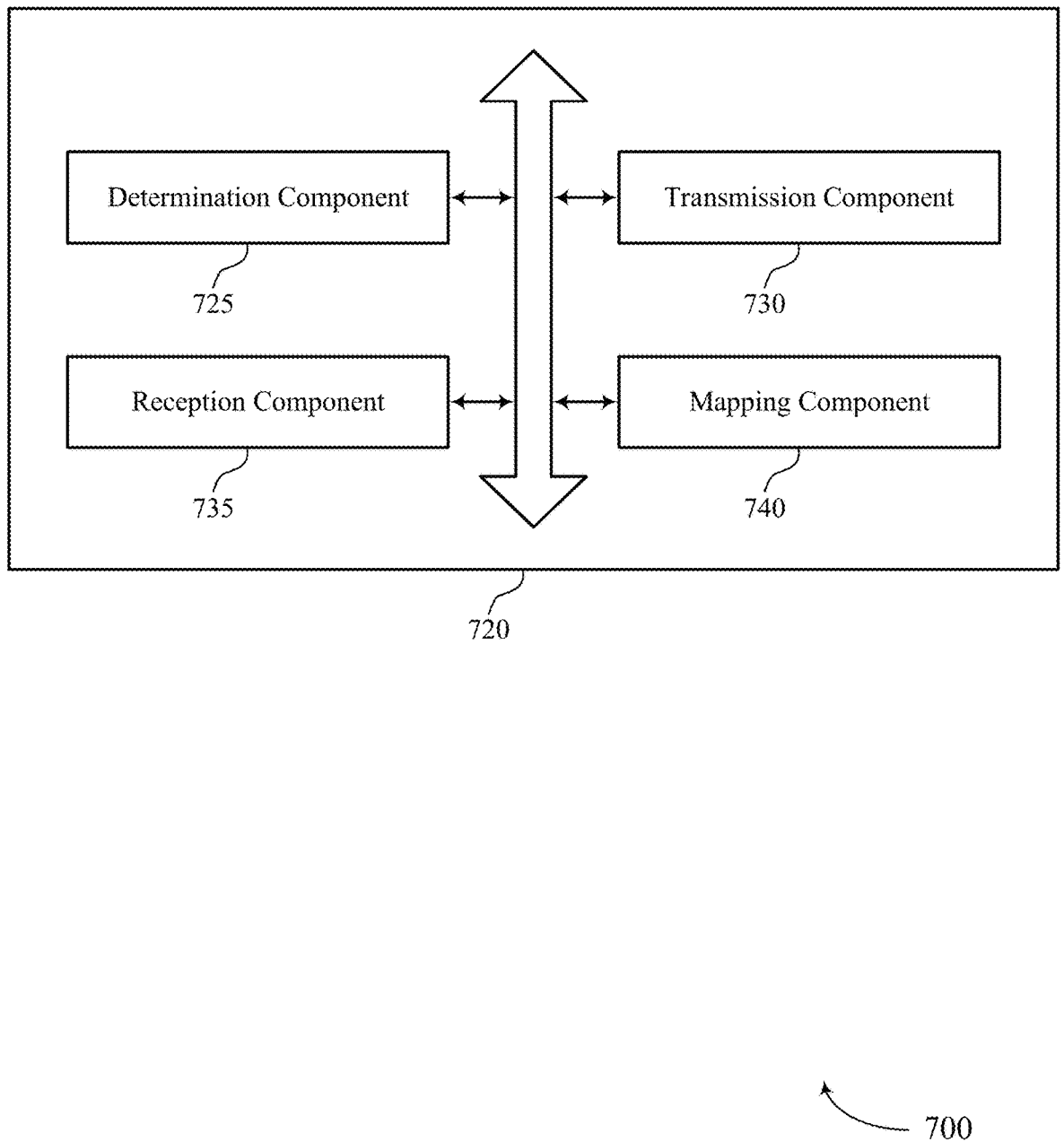
FIG. 7 shows a block diagram of a memory system that supports host-enabled block swap techniques in accordance with examples as disclosed herein.

FIG. 7 shows a block diagram 700 of a memory system 720 that supports host-enabled block swap in accordance with examples as disclosed herein. The memory system 720 may be an example of aspects of a memory system as described with reference to FIGS. 1 through 6. The memory system 720, or various components thereof, may be an example of means for performing various aspects of host-enabled block swap as described herein. For example, the memory system 720 may include a determination component 725, a transmission component 730, a reception component 735, a mapping component 740, or any combination thereof. Each of these components may communicate, directly or indirectly, with one another (e.g., via one or more buses).

The determination component 725 may be configured as or otherwise support a means for determining, at a memory system, a health metric associated with a first physical block and a second physical block of the memory system, where a first logical block of the memory system is associated with a first type of data and is mapped to the first physical block, and where a second logical block of the memory system is associated with a second type of data and is mapped to the second physical block. In some examples, the determination component 725 may be configured as or otherwise support a means for determining, by the memory system, a quantity of program/erase cycles associated with at least the first physical block and the second physical block, where the health metric includes the quantity of program/erase cycles associated with at least the first physical block and the second physical block.

In some examples, the determination component 725 may be configured as or otherwise support a means for determining, at the memory system, a second health metric associated with the second physical block and a third physical block of the memory system.

The transmission component 730 may be configured as or otherwise support a means for transmitting, to a host system, an indication of the health metric associated with the first physical block and the second physical block. In some examples, the transmission component 730 may be configured as or otherwise support a means for transmitting, from the memory system to the host system, an indication of the second health metric associated with the second physical block and the third physical block.

The reception component 735 may be configured as or otherwise support a means for receiving, at the memory system based at least in part on transmitting the health metric to the host system, an indication of an updated mapping associated with the first logical block, the second logical block, the first physical block, and the second physical block. In some examples, the reception component 735 may be configured as or otherwise support a means for receiving, at the memory system from the host system, a first command while the memory system is operating in an idle state, where transmitting the health metric associated with the first physical block and the second physical block of the memory system is based at least in part on receiving the first command.

In some examples, the reception component 735 may be configured as or otherwise support a means for receiving, at the memory system, an indication of an updated mapping between the first logical block and the second physical block and an indication of an updated mapping between the second logical block and the third physical block based at least in part on transmitting the second health metric to the host system.

In some examples, the mapping component 740 may be configured as or otherwise support a means for updating, by the memory system, a table including mappings between a plurality of logical blocks and a plurality of physical blocks of the memory system, where the first logical block is mapped to the second physical block and the second logical block is mapped to the first physical block based at least in part on receiving the indication of the updated mapping.

In some examples, memory cells included in the first physical block are configured to store one bit of data when the first physical block is mapped to the first logical block. In some examples, and the memory cells included in the first physical block are configured to store one or more bits of data when the first physical block is mapped to the second logical block.

Figure 8:
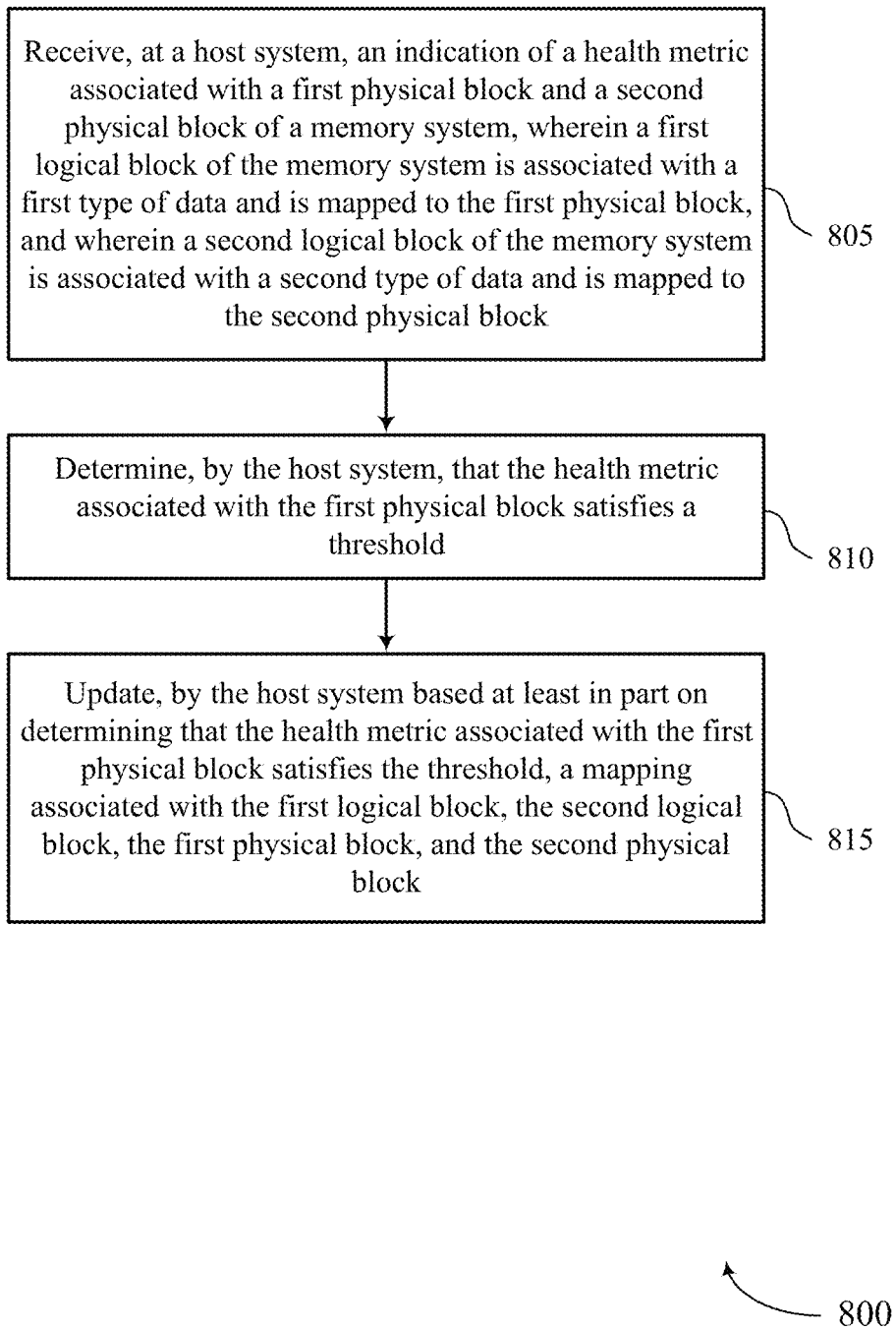
FIGS. 8 through 9 show flowcharts illustrating a method or methods that support host-enabled block swap techniques in accordance with examples as disclosed herein.

FIG. 8 shows a flowchart illustrating a method 800 that supports host-enabled block swap in accordance with examples as disclosed herein. The operations of method 800 may be implemented by a host device or its components as described herein. For example, the operations of method 800 may be performed by a host device as described with reference to FIGS. 1 through 6. In some examples, a host device may execute a set of instructions to control the functional elements of the device to perform the described functions. Additionally or alternatively, the host device may perform aspects of the described functions using special-purpose hardware.

At 805, the method may include receiving, at a host system, an indication of a health metric associated with a first physical block and a second physical block of a memory system, where a first logical block of the memory system is associated with a first type of data and is mapped to the first physical block, and where a second logical block of the memory system is associated with a second type of data and is mapped to the second physical block. The operations of 805 may be performed in accordance with examples as disclosed herein. In some examples, aspects of the operations of 805 may be performed by a reception component 625 as described with reference to FIG. 6.

At 810, the method may include determining, by the host system, that the health metric associated with the first physical block satisfies a threshold. The operations of 810 may be performed in accordance with examples as disclosed herein. In some examples, aspects of the operations of 810 may be performed by a determination component 630 as described with reference to FIG. 6.

At 815, the method may include updating, by the host system based at least in part on determining that the health metric associated with the first physical block satisfies the threshold, a mapping associated with the first logical block, the second logical block, the first physical block, and the second physical block. The operations of 815 may be performed in accordance with examples as disclosed herein. In some examples, aspects of the operations of 815 may be performed by a mapping component 635 as described with reference to FIG. 6.

In some examples, an apparatus as described herein may perform a method or methods, such as the method 800. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving, at a host system, an indication of a health metric associated with a first physical block and a second physical block of a memory system, where a first logical block of the memory system is associated with a first type of data and is mapped to the first physical block, and where a second logical block of the memory system is associated with a second type of data and is mapped to the second physical block; determining, by the host system, that the health metric associated with the first physical block satisfies a threshold; and updating, by the host system based at least in part on determining that the health metric associated with the first physical block satisfies the threshold, a mapping associated with the first logical block, the second logical block, the first physical block, and the second physical block.

Aspect 2: The method, apparatus, or non-transitory computer-readable medium of aspect 1 where updating the mapping between the first logical block and the first physical block and the second logical block and the second physical block includes operations, features, circuitry, logic, means, or instructions, or any combination thereof for mapping the first logical block to the second physical block and mapping the second logical block to the first physical block.

Aspect 3: The method, apparatus, or non-transitory computer-readable medium of aspect 2 where memory cells included in the first physical block are configured to store one bit of data when the first physical block is mapped to the first logical block, and where and the memory cells included in the first physical block are configured to store one or more bits of data when the first physical block is mapped to the second logical block.

Aspect 4: The method, apparatus, or non-transitory computer-readable medium of any of aspects 1 through 3, further including operations, features, circuitry, logic, means, or instructions, or any combination thereof for determining that the health metric associated with the second physical block does not satisfy a second threshold, where updating the mapping between the first logical block and the first physical block and the second logical block and the second physical block is based at least in part on determining that the health metric associated with the first physical block satisfies the threshold and determining that the second physical block does not satisfy the second threshold.

Aspect 5: The method, apparatus, or non-transitory computer-readable medium of any of aspects 1 through 4 where the health metric includes a quantity of program/erase cycles of the first physical block and the second physical block.

Aspect 6: The method, apparatus, or non-transitory computer-readable medium of aspect 5 where determining that the health metric associated with the first physical block satisfies the threshold includes operations, features, circuitry, logic, means, or instructions, or any combination thereof for determining that the first physical block has been subject to a greater quantity of program/erase cycles than a plurality of other physical blocks of the memory system, where the second physical block has been subject to a lesser quantity of program/erase cycles than the first physical block and the plurality of other physical blocks of the memory system.

Aspect 7: The method, apparatus, or non-transitory computer-readable medium of any of aspects 1 through 6 where the health metric includes a duration to write one or more logic states to the first physical block and the second physical block, a duration to erase one or more logic states stored to the first physical block and the second physical block, a duration to read one or more logic states from the first physical block and the second physical block, a quantity of read operations performed on the first physical block and the second physical block, a number of byte failures associated with the first physical block and the second physical block, or any combination thereof.

Aspect 8: The method, apparatus, or non-transitory computer-readable medium of any of aspects 1 through 7 where the first type of data includes user data and the second type of data includes general purpose processing (GPP) data.

Aspect 9: The method, apparatus, or non-transitory computer-readable medium of any of aspects 1 through 8, further including operations, features, circuitry, logic, means, or instructions, or any combination thereof for determining, by the host system, that the memory system is operating in an idle state and transmitting a first command to the memory system based at least in part on determining that the memory system is operating in the idle state, where receiving the health metric associated with the first physical block and the second physical block of the memory system is based at least in part on transmitting the first command.

Aspect 10: The method, apparatus, or non-transitory computer-readable medium of any of aspects 1 through 9, further including operations, features, circuitry, logic, means, or instructions, or any combination thereof for transmitting, based at least in part on updating the mapping between the first logical block and the first physical block and the mapping between the second logical block and the second physical block, a second command to the memory system, where the second command includes an indication for the memory system to update a table including mappings between a plurality of logical blocks and a plurality of physical blocks of the memory system.

Aspect 11: The method, apparatus, or non-transitory computer-readable medium of any of aspects 1 through 10, further including operations, features, circuitry, logic, means, or instructions, or any combination thereof for receiving, at the host system, an indication of a second health metric associated with the second physical block and a third physical block of the memory system; determining, by the host system, that the second health metric associated with the second physical block satisfies the threshold; and updating, by the host system, a mapping between the first logical block and the second physical block and a mapping between the second logical block and the third physical block based at least in part on determining that the second health metric associated with the second physical block satisfies the threshold.

Aspect 12: The method, apparatus, or non-transitory computer-readable medium of any of aspects 1 through 11 where the updated mapping associated with the first logical block, the second logical block, the first physical block, and the second physical block includes operations, features, circuitry, logic, means, or instructions, or any combination thereof for mapping the first logical block to the second physical block and mapping the second logical block to the first physical block.

Figure 9:
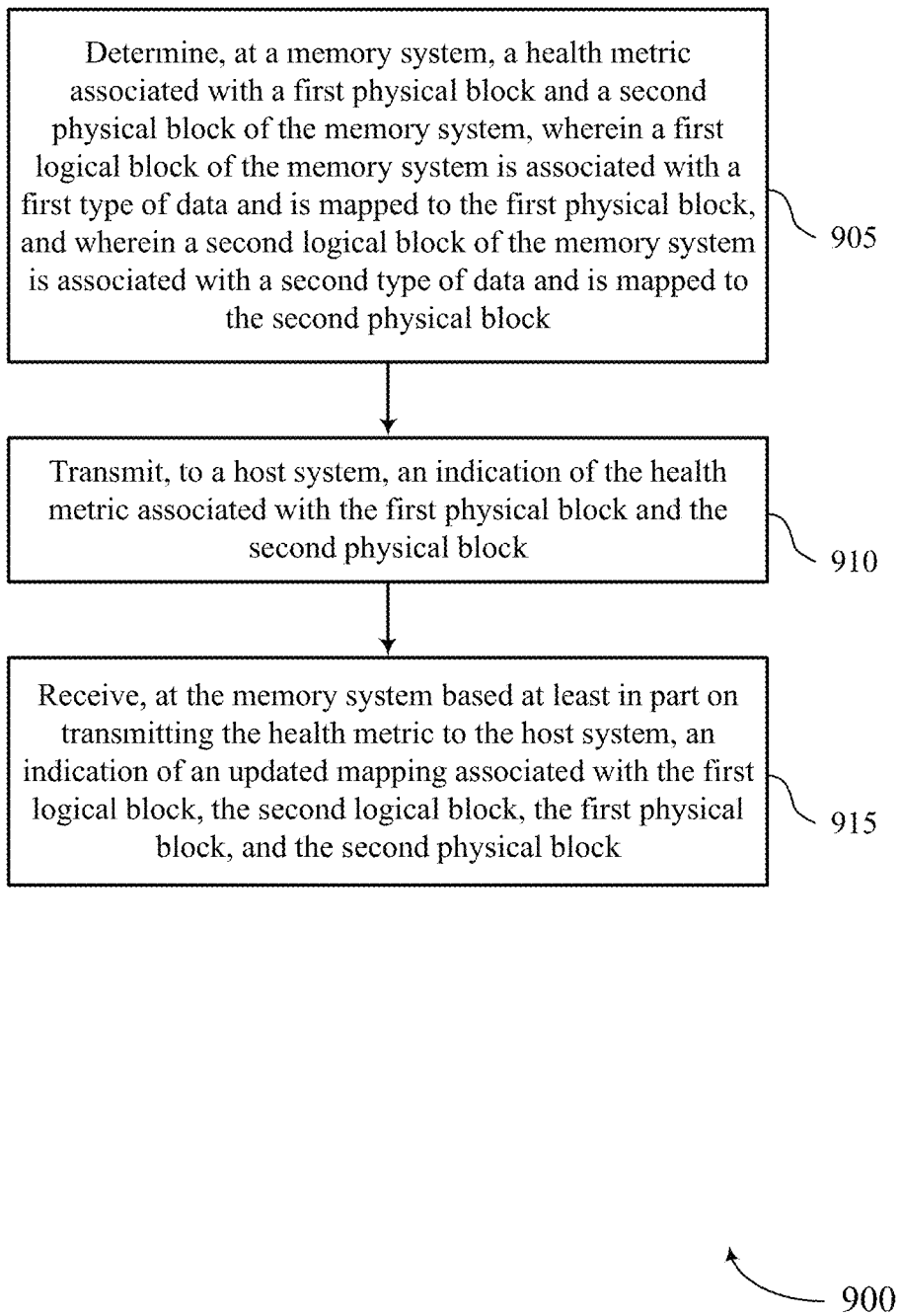

FIG. 9 shows a flowchart illustrating a method 900 that supports host-enabled block swap in accordance with examples as disclosed herein. The operations of method 900 may be implemented by a memory system or its components as described herein. For example, the operations of method 900 may be performed by a memory system as described with reference to FIGS. 1 through 6 and 7. In some examples, a memory system may execute a set of instructions to control the functional elements of the device to perform the described functions. Additionally or alternatively, the memory system may perform aspects of the described functions using special-purpose hardware.

At 905, the method may include determining, at a memory system, a health metric associated with a first physical block and a second physical block of the memory system, where a first logical block of the memory system is associated with a first type of data and is mapped to the first physical block, and where a second logical block of the memory system is associated with a second type of data and is mapped to the second physical block. The operations of 905 may be performed in accordance with examples as disclosed herein. In some examples, aspects of the operations of 905 may be performed by a determination component 725 as described with reference to FIG. 7.

At 910, the method may include transmitting, to a host system, an indication of the health metric associated with the first physical block and the second physical block. The operations of 910 may be performed in accordance with examples as disclosed herein. In some examples, aspects of the operations of 910 may be performed by a transmission component 730 as described with reference to FIG. 7.

At 915, the method may include receiving, at the memory system based at least in part on transmitting the health metric to the host system, an indication of an updated mapping associated with the first logical block, the second logical block, the first physical block, and the second physical block. The operations of 915 may be performed in accordance with examples as disclosed herein. In some examples, aspects of the operations of 915 may be performed by a reception component 735 as described with reference to FIG. 7.

In some examples, an apparatus as described herein may perform a method or methods, such as the method 900. The apparatus may include features, circuitry, logic, means, or instructions (e.g., a non-transitory computer-readable medium storing instructions executable by a processor), or any combination thereof for performing the following aspects of the present disclosure:

Aspect 13: A method, apparatus, or non-transitory computer-readable medium including operations, features, circuitry, logic, means, or instructions, or any combination thereof for determining, at a memory system, a health metric associated with a first physical block and a second physical block of the memory system, where a first logical block of the memory system is associated with a first type of data and is mapped to the first physical block, and where a second logical block of the memory system is associated with a second type of data and is mapped to the second physical block; transmitting, to a host system, an indication of the health metric associated with the first physical block and the second physical block; and receiving, at the memory system based at least in part on transmitting the health metric to the host system, an indication of an updated mapping associated with the first logical block, the second logical block, the first physical block, and the second physical block.

Aspect 14: The method, apparatus, or non-transitory computer-readable medium of aspect 13, further including operations, features, circuitry, logic, means, or instructions, or any combination thereof for updating, by the memory system, a table including mappings between a plurality of logical blocks and a plurality of physical blocks of the memory system, where the first logical block is mapped to the second physical block and the second logical block is mapped to the first physical block based at least in part on receiving the indication of the updated mapping.

Aspect 15: The method, apparatus, or non-transitory computer-readable medium of aspect 14 where memory cells included in the first physical block are configured to store one bit of data when the first physical block is mapped to the first logical block and the memory cells included in the first physical block are configured to store one or more bits of data when the first physical block is mapped to the second logical block.

Aspect 16: The method, apparatus, or non-transitory computer-readable medium of any of aspects 13 through 15, further including operations, features, circuitry, logic, means, or instructions, or any combination thereof for determining, by the memory system, a quantity of program/erase cycles associated with at least the first physical block and the second physical block, where the health metric includes the quantity of program/erase cycles associated with at least the first physical block and the second physical block.

Aspect 17: The method, apparatus, or non-transitory computer-readable medium of any of aspects 13 through 16, further including operations, features, circuitry, logic, means, or instructions, or any combination thereof for receiving, at the memory system from the host system, a first command while the memory system is operating in an idle state, where transmitting the health metric associated with the first physical block and the second physical block of the memory system is based at least in part on receiving the first command.

Aspect 18: The method, apparatus, or non-transitory computer-readable medium of any of aspects 13 through 17, further including operations, features, circuitry, logic, means, or instructions, or any combination thereof for determining, at the memory system, a second health metric associated with the second physical block and a third physical block of the memory system; transmitting, from the memory system to the host system, an indication of the second health metric associated with the second physical block and the third physical block; and receiving, at the memory system, an indication of an updated mapping between the first logical block and the second physical block and an indication of an updated mapping between the second logical block and the third physical block based at least in part on transmitting the second health metric to the host system.

It should be noted that the methods described herein describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The term "layer" or "level" used herein refers to a stratum or sheet of a geometrical structure (e.g., relative to a substrate). Each layer or level may have three dimensions (e.g., height, width, and depth) and may cover at least a portion of a surface. For example, a layer or level may be a three-dimensional structure where two dimensions are greater than a third, e.g., a thin-film. Layers or levels may include different elements, components, and/or materials. In some examples, one layer or level may be composed of two or more sublayers or sublevels.

As used herein, the term "substantially" means that the modified characteristic (e.g., a verb or adjective modified by the term substantially) need not be absolute but is close enough to achieve the advantages of the characteristic.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed, and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed, and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
   a host system comprising a controller, wherein the controller is configured to cause the apparatus to:
   receive, at the host system, an indication of a health metric associated with a first physical block and a second physical block of a memory system, wherein a first logical block of the memory system is associated with a first type of data and is mapped to the first physical block, and wherein a second logical block of the memory system is associated with a second type of data and is mapped to the second physical block;
   determine, by the host system, that the health metric associated with the first physical block satisfies a threshold; and
   update, by the host system based at least in part on determining that the health metric associated with the first physical block satisfies the threshold, a mapping associated with the first logical block, the second logical block, the first physical block, and the second physical block.

2. The apparatus of claim 1, wherein, to update the mapping between the first logical block and the first physical block and the second logical block and the second physical block, the controller is configured to cause the apparatus to:
   map the first logical block to the second physical block; and
   map the second logical block to the first physical block.

3. The apparatus of claim 2, wherein:
   memory cells included in the first physical block are configured to store one bit of data when the first physical block is mapped to the first logical block, and wherein the memory cells included in the first physical block are configured to store one or more bits of data when the first physical block is mapped to the second logical block.

4. The apparatus of claim 1, wherein the controller is further configured to cause the apparatus to:
   determine that the health metric associated with the second physical block does not satisfy a second threshold, wherein updating the mapping between the first logical block and the first physical block and the second logical block and the second physical block is based at least in part on determining that the health metric associated with the first physical block satisfies the threshold and determining that the second physical block does not satisfy the second threshold.

5. The apparatus of claim 1, wherein the health metric comprises a quantity of program/erase cycles of the first physical block and the second physical block.

6. The apparatus of claim 5, wherein, to determine that the health metric associated with the first physical block satisfies the threshold, the controller is configured to cause the apparatus to:
   determine that the first physical block has been subject to a greater quantity of program/erase cycles than a plurality of other physical blocks of the memory system, wherein the second physical block has been subject to a lesser quantity of program/erase cycles than the first physical block and the plurality of other physical blocks of the memory system.

7. The apparatus of claim 1, wherein the health metric comprises a duration to write one or more logic states to the first physical block and the second physical block, a duration to erase one or more logic states stored to the first physical block and the second physical block, a duration to read one or more logic states from the first physical block and the second physical block, a quantity of read operations performed on the first physical block and the second physical block, a number of byte failures associated with the first physical block and the second physical block, or any combination thereof.

8. The apparatus of claim 1, wherein:
   the first type of data comprises user data, and
   the second type of data comprises general purpose processing (GPP) data.

9. The apparatus of claim 1, wherein the controller is further configured to cause the apparatus to:
   determine that the memory system is operating in an idle state; and
   transmit a first command to the memory system based at least in part on determining that the memory system is operating in the idle state, wherein receiving the health metric associated with the first physical block and the second physical block of the memory system is based at least in part on transmitting the first command.

10. The apparatus of claim 1, wherein the controller is further configured to cause the apparatus to:
    transmit, based at least in part on updating the mapping between the first logical block and the first physical block and the mapping between the second logical block and the second physical block, a second command to the memory system, wherein the second command comprises an indication for the memory system to update a table comprising mappings between a plurality of logical blocks and a plurality of physical blocks of the memory system.

11. The apparatus of claim 1, wherein the controller is further configured to cause the apparatus to:
receive an indication of a second health metric associated with the second physical block and a third physical block of the memory system;
determine that the second health metric associated with the second physical block satisfies the threshold; and
update a mapping between the first logical block and the second physical block and a mapping between the second logical block and the third physical block based at least in part on determining that the second health metric associated with the second physical block satisfies the threshold.

12. The apparatus of claim 1, wherein, to update the mapping associated with the first logical block, the second logical block, the first physical block, and the second physical block, the controller is configured to cause the apparatus to:
map the first logical block to the second physical block; and
map the second logical block to the first physical block.

13. An apparatus, comprising:
a memory system comprising a plurality of physical blocks; and
a controller coupled with the plurality of physical blocks, wherein the controller is configured to cause the apparatus to:
determine a health metric associated with a first physical block and a second physical block of the memory system, wherein a first logical block of the memory system is associated with a first type of data and is mapped to the first physical block, and wherein a second logical block of the memory system is associated with a second type of data and is mapped to the second physical block;
transmit, to a host system, an indication of the health metric associated with the first physical block and the second physical block; and
receive, based at least in part on transmitting the health metric to the host system, an indication of an updated mapping associated with the first logical block, the second logical block, the first physical block, and the second physical block.

14. The apparatus of claim 13, wherein the controller is further configured to cause the apparatus to:
update a table comprising mappings between a plurality of logical blocks and the plurality of physical blocks of the memory system, wherein the first logical block is mapped to the second physical block and the second logical block is mapped to the first physical block based at least in part on receiving the indication of the updated mapping.

15. The apparatus of claim 14, wherein:
memory cells included in the first physical block are configured to store one bit of data when the first physical block is mapped to the first logical block; and
the memory cells included in the first physical block are configured to store one or more bits of data when the first physical block is mapped to the second logical block.

16. The apparatus of claim 13, wherein the controller is further configured to cause the apparatus to:
determine a quantity of program/erase cycles associated with at least the first physical block and the second physical block, wherein the health metric comprises the quantity of program/erase cycles associated with at least the first physical block and the second physical block.

17. The apparatus of claim 13, wherein the controller is further configured to cause the apparatus to:
receive, from the host system, a first command while the memory system is operating in an idle state, wherein transmitting the health metric associated with the first physical block and the second physical block of the memory system is based at least in part on receiving the first command.

18. The apparatus of claim 13, wherein the controller is further configured to cause the apparatus to:
determine a second health metric associated with the second physical block and a third physical block of the memory system;
transmit, to the host system, an indication of the second health metric associated with the second physical block and the third physical block; and
receive an indication of an updated mapping between the first logical block and the second physical block and an indication of an updated mapping between the second logical block and the third physical block based at least in part on transmitting the second health metric to the host system.

19. A method, comprising:
receiving, at a host system, an indication of a health metric associated with a first physical block and a second physical block of a memory system, wherein a first logical block of the memory system is associated with a first type of data and is mapped to the first physical block, and wherein a second logical block of the memory system is associated with a second type of data and is mapped to the second physical block;
determining, by the host system, that the health metric associated with the first physical block satisfies a threshold; and
updating, by the host system based at least in part on determining that the health metric associated with the first physical block satisfies the threshold, a mapping associated with the first logical block, the second logical block, the first physical block, and the second physical block.

20. The method of claim 19, wherein updating the mapping between the first logical block and the first physical block and the second logical block and the second physical block comprises:
mapping the first logical block to the second physical block; and
mapping the second logical block to the first physical block.

21. The method of claim 20, wherein memory cells included in the first physical block are configured to store one bit of data when the first physical block is mapped to the first logical block, and wherein and the memory cells included in the first physical block are configured to store one or more bits of data when the first physical block is mapped to the second logical block.

22. The method of claim 19, further comprising:
determining that the health metric associated with the second physical block does not satisfy a second threshold, wherein updating the mapping between the first logical block and the first physical block and the second logical block and the second physical block is based at least in part on determining that the health metric associated with the first physical block satisfies the threshold and determining that the second physical block does not satisfy the second threshold.

23. The method of claim 19, wherein the health metric comprises a quantity of program/erase cycles of the first physical block and the second physical block.

24. The method of claim 23, wherein determining that the health metric associated with the first physical block satisfies the threshold comprises:
   determining that the first physical block has been subject to a greater quantity of program/erase cycles than a plurality of other physical blocks of the memory system, wherein the second physical block has been subject to a lesser quantity of program/erase cycles than the first physical block and the plurality of other physical blocks of the memory system.

25. A method, comprising:
determining, at a memory system, a health metric associated with a first physical block and a second physical block of the memory system, wherein a first logical block of the memory system is associated with a first type of data and is mapped to the first physical block, and wherein a second logical block of the memory system is associated with a second type of data and is mapped to the second physical block;
transmitting, to a host system, an indication of the health metric associated with the first physical block and the second physical block; and
receiving, at the memory system based at least in part on transmitting the health metric to the host system, an indication of an updated mapping associated with the first logical block, the second logical block, the first physical block, and the second physical block.

* * * * *